(12) United States Patent
Masamura

(10) Patent No.: US 8,267,372 B2
(45) Date of Patent: Sep. 18, 2012

(54) COVER-EQUIPPED MANUAL VALVE

(75) Inventor: Akinori Masamura, Komaki (JP)

(73) Assignee: CKD Corporation, Komaki (JP)

( * ) Notice: Subject to any disclaimer, the term of this patent is extended or adjusted under 35 U.S.C. 154(b) by 397 days.

(21) Appl. No.: 12/591,304

(22) Filed: Nov. 16, 2009

(65) Prior Publication Data

US 2010/0155641 A1 Jun. 24, 2010

(30) Foreign Application Priority Data

Dec. 19, 2008 (JP) ................................ 2008-324292

(51) Int. Cl.
*F16K 35/00* (2006.01)
(52) U.S. Cl. .......... 251/93; 251/101; 251/297; 251/331; 251/335.2
(58) Field of Classification Search .............. 251/79–81, 251/331, 335.2, 297, 266–269, 215, 89, 90, 251/93, 101
See application file for complete search history.

(56) References Cited

U.S. PATENT DOCUMENTS

| | | | |
|---|---|---|---|
| 7,584,936 B2 * | 9/2009 | Lewis et al. ...................... | 251/81 |
| 8,025,268 B2 * | 9/2011 | Masamura et al. .............. | 251/81 |
| 8,087,641 B2 * | 1/2012 | Masamura .................... | 251/331 |
| 8,104,742 B2 * | 1/2012 | Ishihara et al. ................ | 251/265 |

FOREIGN PATENT DOCUMENTS

| | | |
|---|---|---|
| JP | U-54-003638 | 1/1979 |
| JP | U-54-024732 | 2/1979 |
| JP | U-60-073975 | 5/1985 |
| JP | U-60-084877 | 6/1985 |
| JP | U-64-049782 | 3/1989 |
| JP | A-02-249015 | 10/1990 |
| JP | U-02-121680 | 10/1990 |
| JP | A-06-034070 | 2/1994 |
| JP | A-06-034071 | 2/1994 |
| JP | A-08-086368 | 4/1996 |
| JP | A-2004-324661 | 11/2004 |
| JP | A-2005-344918 | 12/2005 |
| JP | A-2009-150529 | 7/2009 |

OTHER PUBLICATIONS

Japanese Office Action issued in Japanese Patent Application No. 2008-324292 dated Aug. 31, 2010 (with translation).

* cited by examiner

*Primary Examiner* — John K Fristoe, Jr.
*Assistant Examiner* — Marina Tietjen
(74) *Attorney, Agent, or Firm* — Oliff & Berridge, PLC

(57) ABSTRACT

A cover-equipped manual valve having a ratchet mechanism for preventing rotation of a knob, comprising: a rod formed with an external thread portion on an outer periphery thereof, the rod being unconnected to the knob and held against rotation; a sliding nut of a cylindrical shape, the sliding nut being rotatably held by a body and internally formed with an internal thread portion threadedly engaged with the external thread portion of the rod; an engagement member fixed to the knob, the engagement member being elastically deformable to be engaged with the sliding nut and to be disengaged from the sliding nut when larger torque than a predetermined value is applied to the engagement member; and a knob cover of a hollow shape for covering the knob.

5 Claims, 17 Drawing Sheets

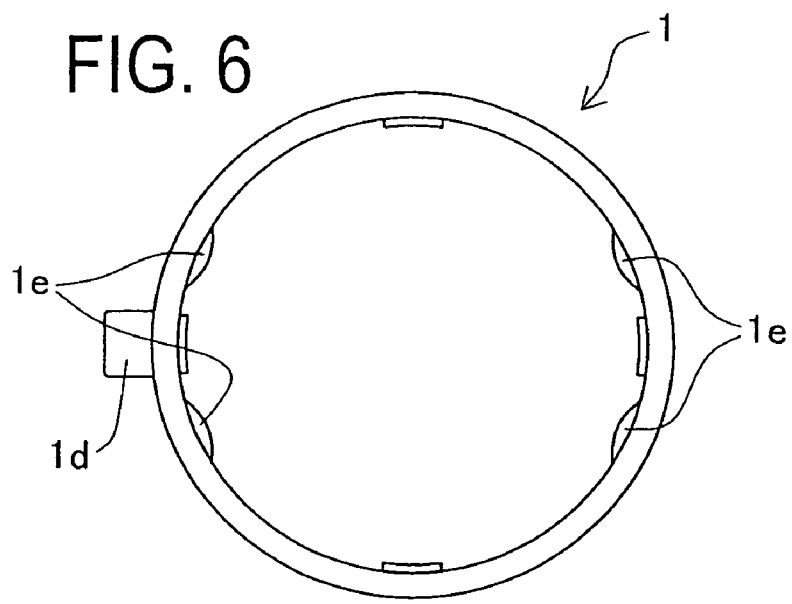
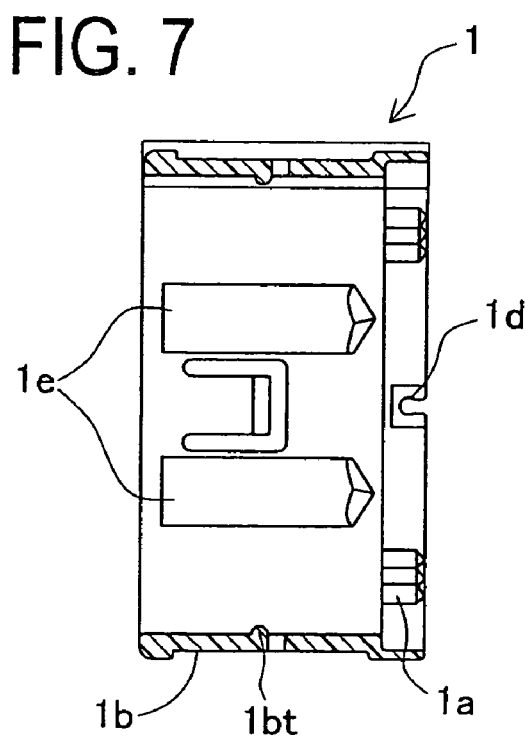

COVER-EQUIPPED MANUAL VALVE

CROSS-REFERENCE TO RELATED APPLICATIONS

This application is based upon and claims the benefit of priority from the prior Japanese Patent Application No. 2008-324292 filed on Dec. 19, 2008, the entire contents of which are incorporated herein by reference.

TECHNICAL FIELD

The present invention relates to a manual valve for controlling fluid by manually rotating a knob and more particularly to a manual valve for controlling chemical liquid or the like to be used in a semiconductor manufacturing device.

BACKGROUND ART

Heretofore, a manual valve has been employed in a semiconductor manufacturing device, for example, as a chemical liquid valve for controlling the flow of a chemical liquid to be supplied to a chemical liquid supply unit or as a chemical liquid collecting valve or the like for sampling a chemical liquid. Some of the such manual valves are designed such that a valve element is moved by rotation of a knob through a rod (see Patent Literatures 1 and 2).

An explanation of a manual valve disclosed in the Patent Literature 1 is now given referring to FIG. 19.

A manual valve 301A is formed with a valve main body 303, a diaphragm retainer 304, a cylinder 305, a diaphragm valve element 309, a valve rod 310, a knob 312A, and others. The diaphragm valve element (valve element) 309 includes a peripheral portion firmly held between the valve main body 303 and the retainer 304 and also includes a center portion threaded with the valve rod 310. The valve rod 310 is continuously urged upward by a spring 311. The knob 312A is threadedly engaged with the cylinder 305 so that the knob 312A internally contacts with an upper end of the rod 310.

In the manual valve 301A of the Patent Literature 1, when the knob 312A is turned to move upward/downward as being held in contact with the valve rod 310, this rod 310 is moved in an opening/closing direction against the urging force of the spring 311, so that a valve opening degree can be adjusted.

A manual valve disclosed in the Patent Literature 2 is explained referring to FIG. 20.

A manual valve 401 is formed with a handle (knob) 411, a sliding nut 413, a piston 423, a metal spring 426, a valve element 433, a valve seat 434, and others.

A thread portion 413a of the sliding nut 413 is threadedly engaged with a thread portion 423a of the piston 423 to connect the nut 413 with the piston 423 so that the nut 413 is rotated together with the handle 411. The valve element 433 includes a peripheral end portion 433a firmly held between a valve main body 431 and a lower piston cylinder 422 and also has a center portion integrally connected with the piston 423. The piston 423 is continuously urged downward by the spring 426.

In the manual valve 401 of the Patent Literature 2, when the handle 411 is rotated in a valve closing direction, the piston 423 is moved downward by screw feeding with respect to the sliding nut 413 to bring the valve element 433 downward into contact with the valve seat 434 by the urging force of the spring 426. When the valve element 433 is placed in contact with the valve seat 434 into a valve closing position, the thread portion 413a of the sliding nut 413 and the thread portion 423a of the piston 423 are disengaged and the handle 411 turns free.

CITATION LIST

Patent Literature

Patent Literature 1: JP2004-324661A
Patent Literature 2: JP2005-344918A

SUMMARY OF INVENTION

Technical Problem

In a manual vale such as the valve 301A disclosed in the Patent Literature 1, a rod being in contact with a knob is threadedly moved by rotation of the knob, thereby moving a valve element. However, in a valve closing operation by turning the knob, the knob could be rotated more than necessary by excessive torque even after the valve element came to contact with a valve seat. Then, the valve element integrally connected with the piston could excessively press the valve seat, resulting in damages such as deformation or breakage of the valve seat.

On the other hand, a manual valve such as the manual valve 401 of the Patent Literature 2 is configured so that a valve element is brought into contact with a valve seat by the urging force of a spring for valve closing. Therefore, such configuration is likely to be complicated and the number of components is increased, leading to cost increase. Furthermore, installation of the spring causes upsizing of the manual valve, making it difficult to downsize the manual valve. Moreover, since the metal spring is provided to bring the valve element into contact with the valve seat for the valve closing, there is a possibility that leaking chemical liquid intrudes into the manual valve through a periphery of the knob and such chemical liquid could attach to the spring. Accordingly, the spring suffers from deterioration, erosion, rust or the like caused by the leaking chemical liquid, and thus the manual valve could fail to close appropriately.

To solve the problems mentioned above, the present applicant has proposed a manual valve having a valve element to be moved through a rod in Japanese Unexamined Patent Application Publication No. JP2009-150529A. This manual valve has an inexpensive and compact configuration that can prevent a valve seat from damages even if a knob is rotated with a larger torque than a predetermined value.

The manual valve in JP'529A capable of being closed with a constant load has a ratchet mechanism that makes a knob turn free when an excessive torque acts on the valve.

The manual valve in JP'529A, however, has the following problems.

The manual valve in JP'529A includes no lock mechanism. Accordingly, unexpected vibration may cause the manual valve to become loose and rotate and thereby the manual valve could open or close. It is further conceivable that, at an operation site, an operator who is operating a manual valve accidentally touches another manual valve placed on the near side to the operator. Thus, the knob of the nontarget valve may be turned wrongly.

To avoid the above problem, a manual valve needs to be provided with a lock mechanism. One option to provide a lock mechanism is to fix a sliding nut for directly moving a valve element. However, in the manual valve in JP'529A, even if a sliding nut is fixed, a knob could be rotated by the ratchet mechanism. When an operator rotates the knob without noticing the sliding nut is fixed, the knob could be rotated with snapping noise caused by the ratchet mechanism. In an operation place of this manual valve having the ratchet mechanism, a notice "Stop operation when the snapping noise occurs because the valve closing or opening is about to be terminated" is displayed. In this case, there is a possibility that the operator misunderstands the valve opening/closing has been terminated by this display and the snapping noise.

The present invention has been made to solve the above problems and has a purpose to provide a cover-equipped manual valve for controlling flow rate while preventing malfunction.

Solution to Problem

To achieve the purpose of the invention, one aspect of the present invention provides a cover-equipped manual valve comprising: a manual valve; an inlet port; an outlet port; a valve seat formed in a passage for fluid communicating the inlet port and the outlet port; a valve element that is movable into or out of contact with the valve seat to control a flow of the fluid; a rod connected to the valve element; a knob for moving the rod by screw feeding in an opening/closing direction of the valve element; and a body. The cover-equipped manual valve is arranged to move the valve element through the rod by rotation of the knob, wherein the rod is formed with an external thread portion on an outer periphery thereof, the rod being unconnected to the knob and held against rotation. The cover-equipped manual valve further comprises: a rod feeding member of a cylindrical shape, the rod feeding member being rotatably held by the body and internally formed with an internal thread portion threadedly engaged with the external thread portion of the rod; an engagement member fixed to the knob, the engagement member being elastically deformable to be engaged with the rod feeding member and to be disengaged from the rod feeding member when larger torque than a predetermined value is applied to the engagement member; and a knob cover of a hollow shape for covering the knob.

Advantageous Effects of Invention

According to the above configuration, a manual valve having a ratchet mechanism is formed with a hollow knob cover covering a knob of the manual valve to disallow access to the knob. Therefore, while an operator operates a manual valve placed on the far side from the operator, he/she is unlikely to accidentally touch a manual valve placed on the near side to the operator and rotate a knob thereof. The valve is not rotated and therefore the operator does not misunderstand that a valve opening/closing is completed.

Furthermore, attachment of the knob cover makes it easy to acknowledge that the manual valve is locked from outward appearance. Accordingly, the knob is not caused to rotate by the operator during the operation and therefore the operator can conduct the operation precisely, thereby accurately controlling the flow rate.

BRIEF DESCRIPTION OF DRAWINGS

FIG. 6 is a plan view of the knob cover in the first embodiment;
FIG. 7 is a sectional front view of the knob cover in FIG. 6.

DESCRIPTION OF EMBODIMENTS

A detailed description of preferred embodiments of a cover-equipped manual valve embodying the present invention will now be given referring to the accompanying drawings.

First Embodiment

Overall Configuration of a Cover-Equipped Manual Valve

Figure 1:
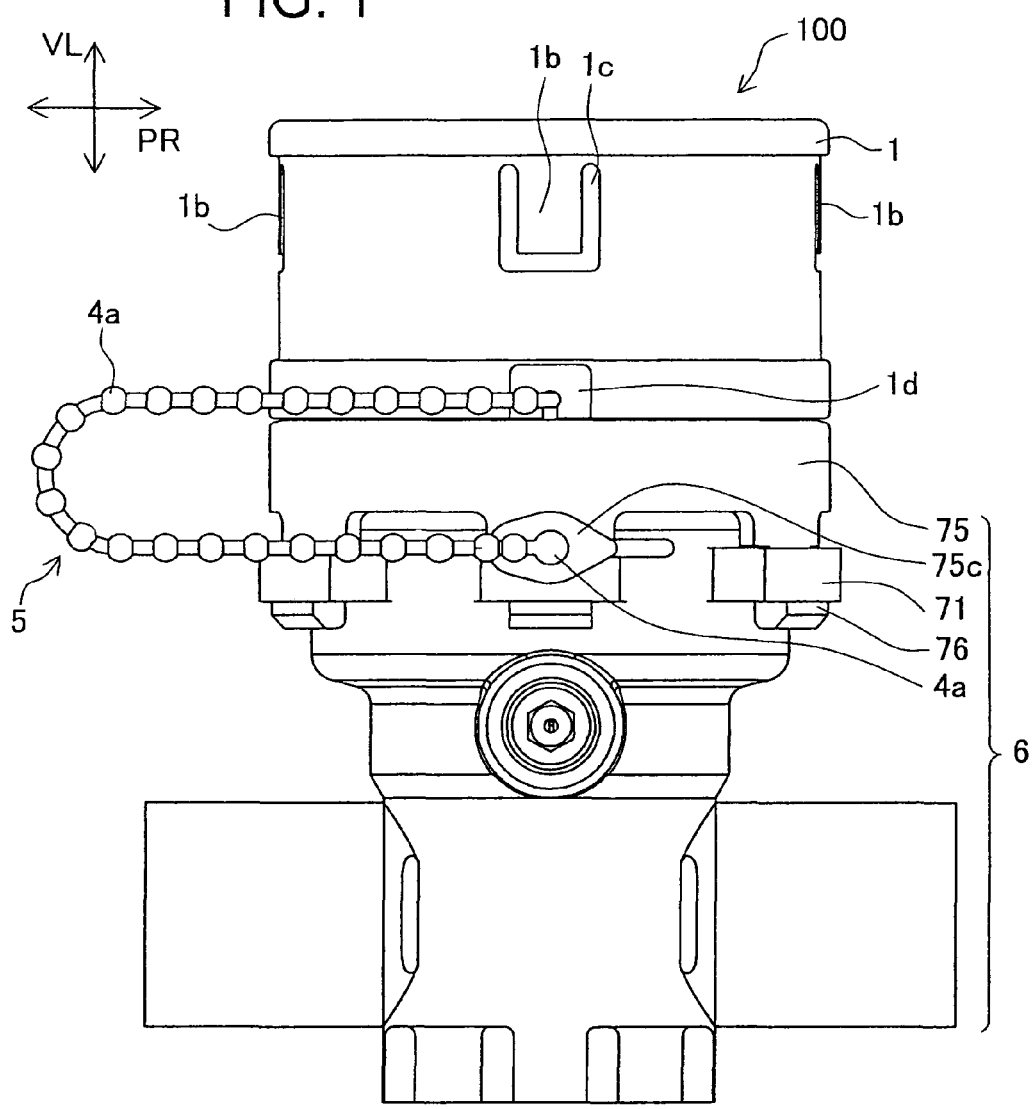
FIG. 1 is an external view of a cover-equipped manual valve in a first embodiment.
Figure 3:
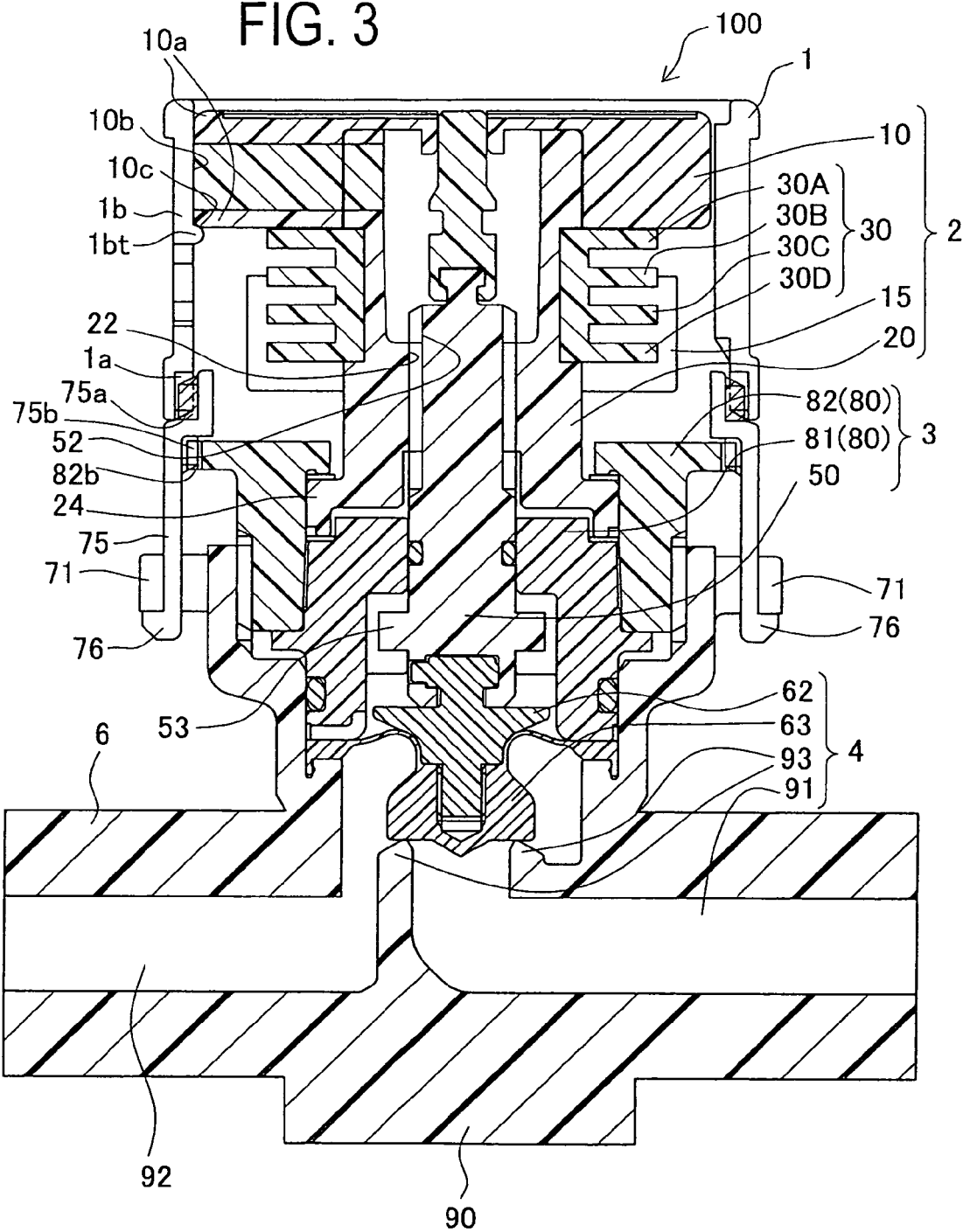
FIG. 3 is a cross-sectional view of the cover-equipped manual valve shown in FIG. 1.

FIG. 1 shows an external view of a cover-equipped manual valve 100 (hereinafter, also referred to a "valve assembly") in a first embodiment. FIG. 3 is a cross-sectional view of the valve assembly 100 in FIG. 1.

As shown in FIG. 1, the valve assembly 100 includes a knob cover 1 and a manual valve 6. The knob cover 1 is mounted on the manual valve 6. A detailed explanation for the knob cover 1 and the manual valve 6 will be given thereafter.

<Configuration of the Manual Valve>

Figure 2:
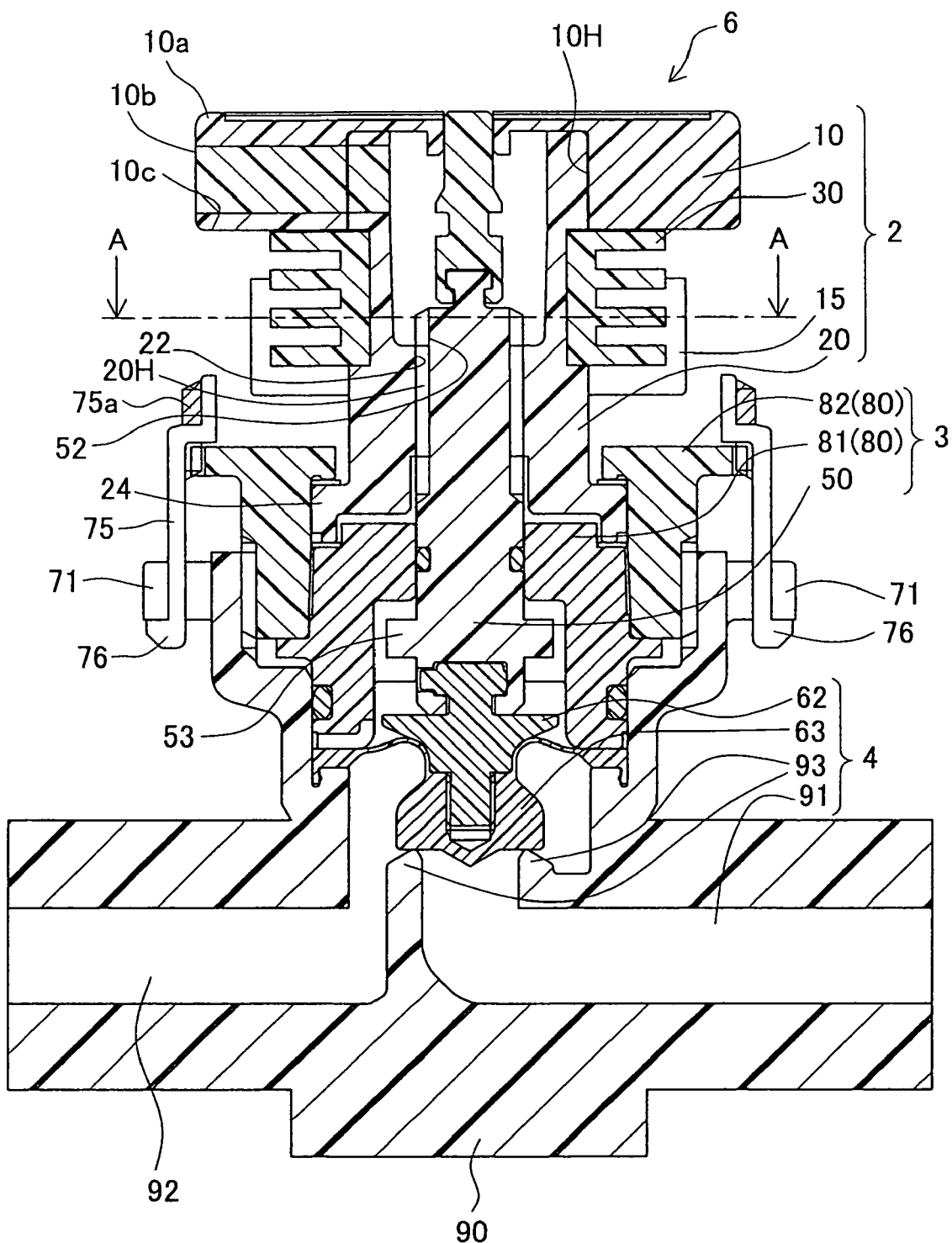
FIG. 2 is a cross-sectional view of a manual valve.
Figure 4:
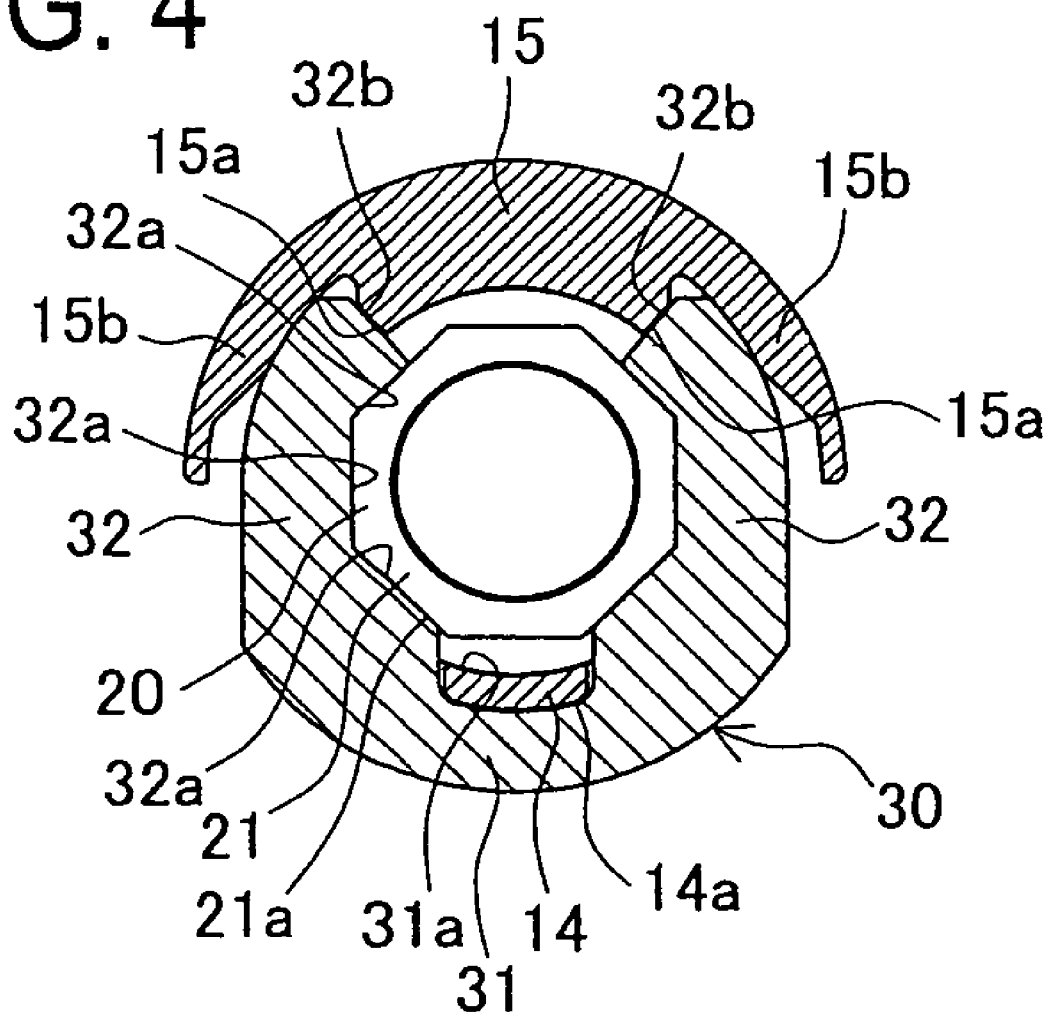
FIG. 4 is a cross-sectional view of the manual valve taken along a line A-A in FIG. 2.

FIG. 2 is a cross-sectional view of the manual valve 6 exposed by removal of the knob cover 1 from the valve assembly 100 in FIG. 1. FIG. 4 is a cross-sectional view of the manual valve 6 taken along a line A-A in FIG. 2. The manual valve 6 includes an operation section 2, a motion transmission section 3, and a valve mechanism 4.

The operation section 2 includes a knob 10, a sliding nut (a rod feeding member) 20, a second locking portion 15, an engagement member 30, and others.

Figure 5:
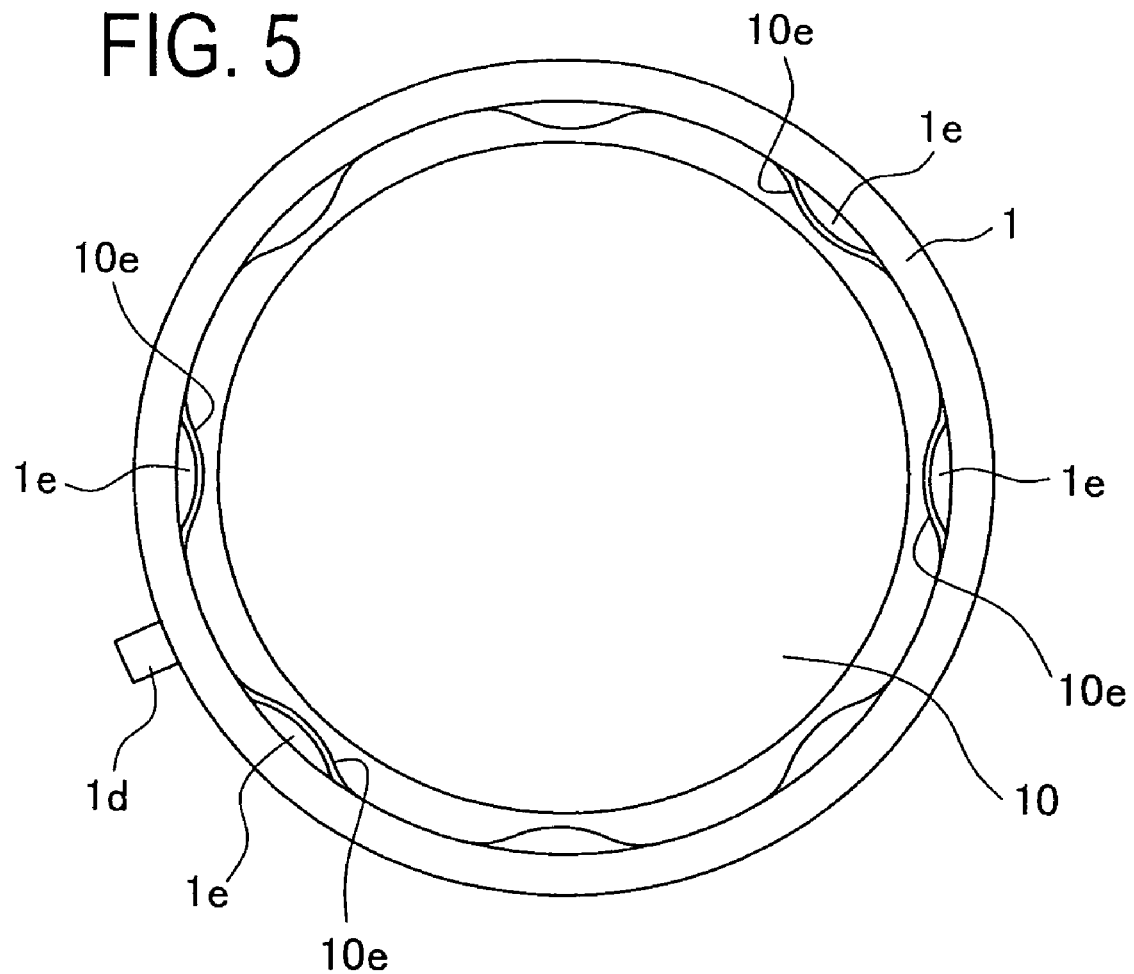
FIG. 5 is a plan view of a knob cover and a knob shown in FIG. 1.

The knob 10 shown in FIG. 2 is made of resin. FIG. 5 shows a plan view of the knob cover 1 and the knob 10 in FIG. 1. As shown in FIG. 5, the knob 10 is formed with cutouts (recesses) 10e on an outer periphery thereof. Each cutout 10e is of circular arc shape in section and the eight cutouts 10e having equal widths are circumferentially provided at equal intervals. The cutouts 10e can make it easy for an operator to hook operator's fingers on the knob 10. Namely, the knob 10 can be easily rotated even if operator's hand is slippery.

On the back of the manual valve 6, even though it is not shown in FIG. 2, a second locking portion 15 is formed perpendicularly extending downward from a lower surface of the knob 10. Even though it is not shown in FIG. 2, a first locking portion 14 is formed inside the knob 10. As shown in FIG. 4, the first and second locking portions 14 and 15 are placed in a diametrical opposed position. The first locking portion 14 includes a contact surface 14a facing outwardly in a radial direction PR. The second locking portion 15 includes two contact surfaces 15a. In FIG. 4, both ends of the second locking portion 15 are formed with a pair of pressing portions 15b each being elastically deformable outwardly in the radial direction. Each pressing portion 15b is deformed outwardly to firmly grasp the engagement member 30 which will be described later and thereby the pressing portions 15b give a predetermined elastic force on the engagement member 30 in a direction to grasp the sliding nut 20.

In FIG. 2, the sliding nut 20 corresponding to a rod feeding member in the invention is made of resin. As shown in FIG. 2, the sliding nut 20 is of a nearly cylindrical shape, comprising a through hole 20H formed at a diametrical center to extend in the opening/closing direction VL. This sliding nut 20 further includes a internal thread portion 22 in the through hole 20H, the thread portion 22 being engaged with an external thread portion 52 of a rod 50.

As shown in FIG. 4, the sliding nut 20 is provided with an engagement part 21 closer to one end in the opening/closing direction VL. The engagement part 21 is formed with eight outer surfaces 21a, which are continuously in an octagonal shape, on a radially inner side than an outer periphery of the sliding nut 20.

On an outer periphery of the sliding nut 20 closer to the other end in the opening/closing direction VL, a flange 24 is provided to prevent the sliding nut 20 from moving in the opening/closing direction VL and to hold the sliding nut 20 itself in place.

The sliding nut 20 is held, through the flange 24, by a body 80 of the motion transmission section 3. Specifically, the body 80 includes a rod holding member 81 and a sliding nut holding member 82. The sliding nut 20 is rotatably held by the sliding nut holding member 82 while the flange 24 is supported on the rod holding member 81.

In the first embodiment, as shown in FIG. 2, the flange 24 is formed with a projection protruding downward in the opening/closing direction VL. Further, the sliding nut holding member 82 is formed with a projection protruding downward in the opening/closing direction VL in a portion where the sliding nut holding member 82 is in contact with the flange 24. Since the flange 24 and the sliding nut holding member 82 have such the projections respectively, the flange 24 can have a small contact area with each of the rod holding member 81 and the sliding nut holding member 82, so that the sliding nut 20 can be easily rotated with respect to the rod holding member 81 and the sliding nut holding member 82.

The engagement member 30 in the invention is made of resin. As shown in FIG. 4, the engagement member 30 shaped like the letter C includes a fixing portion 31 and a pair of holding portions 32 extending from both ends of the fixing portion 31. The holding portions 32 are elastically deformable in an inward-outward direction to move apart from each other and move back to respective original position.

The fixing portion 31 includes a first contact surface 31a which comes into contact with the contact surface 14a of the first locking portion 14 of the knob 10 when the knob 10 and the sliding nut 20 are connected together by the engagement member 30. The holding portions 32 include second contact surfaces 32b which come into contact with the contact surfaces 15a of the second locking portion 15 of the knob 10. Further, the holding portions 32 include contact surfaces 32a respectively, each contact surface 32a being able to contact with any one of the eight outer surfaces 21a of the engagement part 21.

As shown in FIG. 3, the engagement member 30 includes four divided holding portions 30A, 30B, 30C, and 30D. Each pressing portion 15b of the second locking portion 15 has a thickness so as to vertically cover the holding portions 30A, 30B, 30C, and 30D. The engagement member 30 is divided into four layers so that each holding portion 32 has the wide contact surface 32a with respect to the sliding nut 20 while having necessary elastic force (grasping force). With such a configuration having the wide contact surface 32a, even when the engagement member 30 is repeatedly separated from and brought into contact with the sliding nut 20, the holding portions 32 can be hardly deformed.

In the first embodiment, as shown in FIG. 4, the knob 10 and the sliding nut 20 are connected as follows. First, the first contact surface 31a of the fixing portion 31 of the engagement member 30 is brought into contact with the contact surface 14a of the first locking portion 14 of the knob 10. Then, the six contact surfaces 32a of the holding portions 32 are brought into contact with six of the eight outer surfaces 21a of the engagement part 21. At the same time, the second contact surfaces 32b of the holding portions 32 are brought into contact with the contact surfaces 15a of the second locking portion 15 of the knob 10.

As mentioned above, the engagement member 30 is fixed in engagement with the first and second locking portions 14 and 15 of the knob 10 and the engagement part 21 of the sliding nut 20, thus holding six of the eight outer surfaces 21a of the engagement part 21 of the sliding nut 20. Accordingly, the knob 10 and the sliding nut 20 are integrally connected, so that the sliding nut 20 can be circumferentially rotated with the knob 10 in accordance with the rotation of the knob 10.

As shown in FIG. 2, a plurality of receiving portions 71 including openings are provided on an outer periphery of a valve body 90. A locking cover 75 is mounted on an outer periphery of the body 80 in the present embodiment, the locking cover 75 including hooks 76 on its distal end (i.e., a lower end in the figure) in correspondence to the openings of the receiving portions 71.

Figure 9:
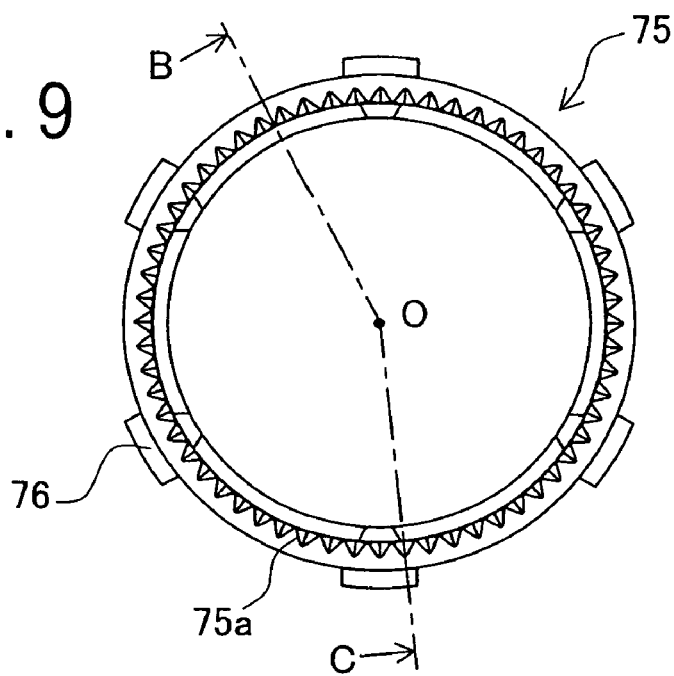
FIG. 9 is a plan view of a locking cover.
Figure 10:
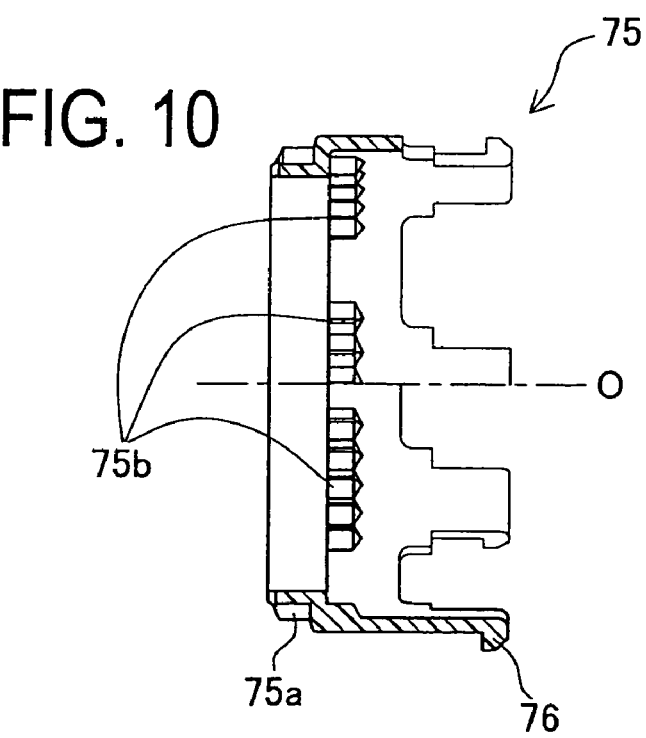
FIG. 10 is a cross-sectional view of the locking cover taken along a line B-O-C in FIG. 9.
Figure 11:
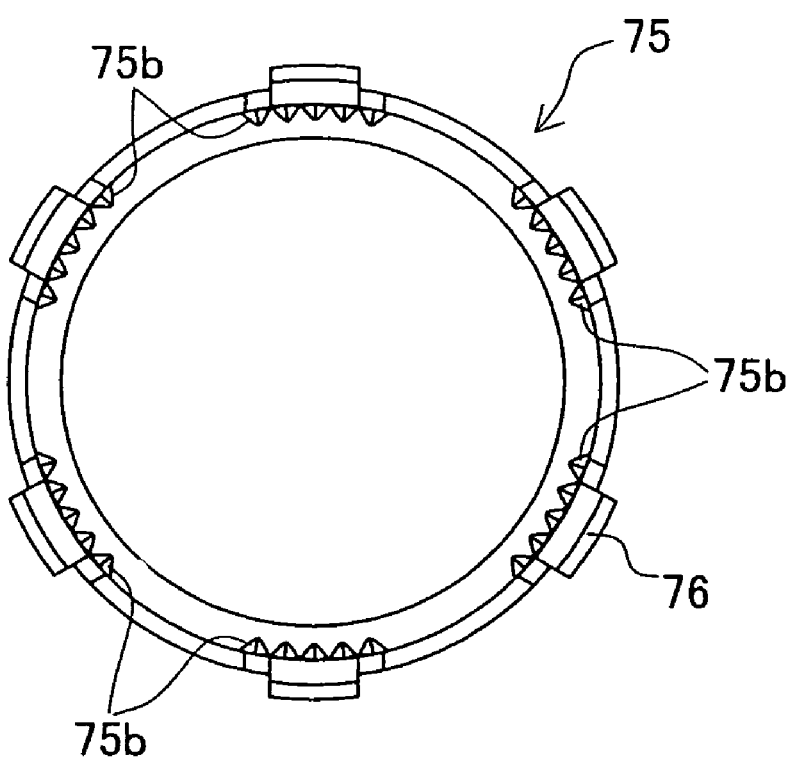
FIG. 11 is a bottom view of the locking cover in FIG. 9.

FIG. 9 shows a plan view of the locking cover 75. FIG. 10 is a cross-sectional view of the locking cover 75 taken along a line B-O-C in FIG. 9. FIG. 11 is a bottom view of the locking cover 75.

The locking cover 75 is of a hollow cylindrical shape. As shown in FIGS. 3 and 10, the locking cover 75 is formed with the hooks 76 on the lower end in the opening/closing direction VL (in FIG. 3). As shown in FIGS. 3 and 9, on an upper end of the locking cover 75 in the opening/closing direction VL (in FIG. 3), a first engagement portion 75a is circumferentially formed. The first engagement portion 75a is knurled or saw-toothed in section as shown in FIG. 9.

On an inner peripheral wall of the locking cover 75, six second engagement portions 75b are formed. As shown in FIG. 11, each second engagement portion 75b is also knurled or saw-toothed in section. Furthermore, the second engagement portions 75b having equal widths are circumferentially formed at equal intervals.

As shown in FIG. 3, the body 80 and the valve body 90 are engaged in a manner that the second engagement portions 75b of the locking cover 75 is engaged with an engagement portion (not shown) of the body 80 and the hooks 76 of the locking cover 75 are engaged in the openings of the receiving portion 71 of the valve body 90.

As shown in FIG. 1, on a side surface of the locking cover 75, a connection member engagement portion 75c is formed. In FIGS. 9 to 11, the connection member engagement portion 75c is not illustrated.

The motion transmission section 3 is explained below.

As shown in FIG. 2, the motion transmission section 3 includes the rod 50, the body 80 as mentioned above, and others.

The rod 50 is made of resin and, on an outer periphery thereof, includes the external thread portion 52 and a rotation stopper member 53 which prevents the rod 50 from rotation on its axis. The rod 50 is not directly connected with the knob 10, but movably placed inside the rod holding member 81, a through hole 10H of the knob 10, and the through hole 20H of the sliding nut 20 in the opening/closing direction VL. In the rod 50, the rotation stopper member 53 is circumferentially engaged with a not shown part of the rod holding member 81 to prevent the rod 50 from rotating inside the rod holding member 81.

The valve mechanism 4 is now explained below.

As shown in FIG. 2, the valve mechanism 4 includes a valve element holding member 62, a valve element 63, the valve body 90, and others. The valve element holding member 62 is integrally firmly fixed to one end of the rod 50 (a valve closing side in the opening/closing direction VL in FIG. 2) and also firmly fixed to the valve element 63 serving as a diaphragm. The valve body 90 includes a first port 91, a second port 92, and a valve seat 93. The valve body 90 is integrally firmly fixed with the body 80.

In the manual valve 6, as will be described later, when the knob 10 is rotated, the rod 50 is moved in the opening/closing direction VL, and accordingly the valve element 63 is moved in the opening/closing direction VL through the rod 50. When the rod 50, i.e., the valve element 63 is moved to the valve closing side in the opening/closing direction VL (a lower side in FIG. 2) to come into contact with the valve seat 93, the manual valve 6 is placed in a valve closed state. On the contrary, when the valve element 63 is moved to a valve opening side in the opening/closing direction VL (an upper side in FIG. 2) to separate from the valve seat 93, the manual valve 6 is placed in a valve open state.

<Configuration of the Knob Cover>

Figure 8:
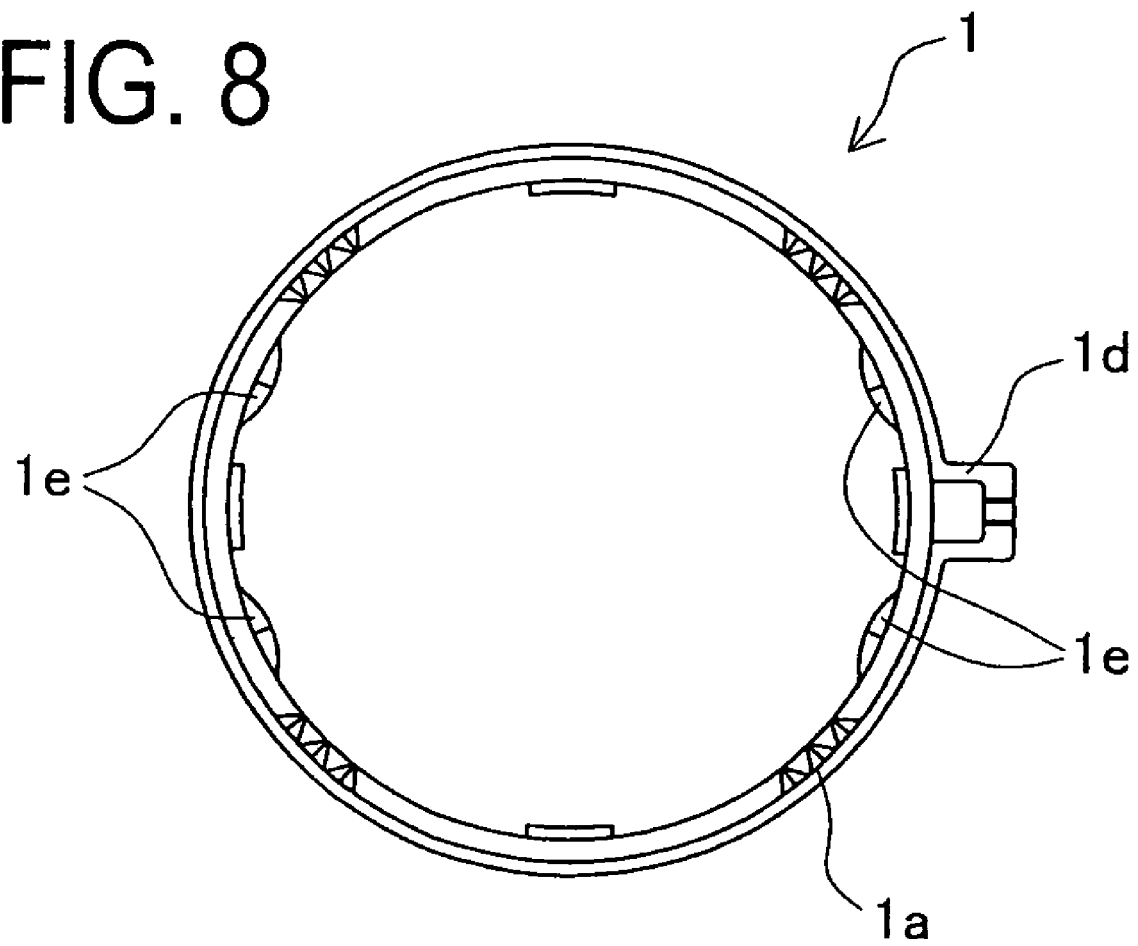
FIG. 8 is a bottom view of the knob cover in FIG. 6.

FIG. 6 is a plan view of the knob cover 1. FIG. 7 is a sectional front view of the knob cover 1. FIG. 8 is a bottom view of the knob cover 1.

The knob cover 1 is of a hollow cylindrical shape.

As shown in FIG. 3, an inner diameter of the knob cover 1 is designed larger than an outer diameter of the knob 10 for covering the knob 10. As shown in FIG. 8, in an inner periphery of the knob cover 1, four engagement portions 1a having equal widths are circumferentially formed at equal intervals. The engagement portions 1a are knurled or saw-toothed in section similar to the first engagement portions 75a of knurled shape so that the engagement portions 1a and the first engagement portions 75a can be fitted together.

As shown in FIGS. 1 and 3, an outer peripheral wall of the knob cover 1 is formed with groove portions is formed of U-shaped cutouts. The groove portions 1c formed of U-shaped cutouts (see FIG. 1) provide snaps 1b inside the respective cutouts. Four pairs of snaps 1b and four groove portions 1c are circumferentially formed on the outer peripheral wall and equally spaced from each other. Further, a distal end of each snap 1b on the inner peripheral wall is formed with a snap fitting protrusion 1bt.

As shown in FIGS. 6 to 8, on an inner peripheral wall of the knob cover 1, arc-shaped guiding portions 1e are formed each extending in a vertical direction with respect to the drawing sheet of FIG. 6 (i.e., in a lateral direction in FIG. 7). The guiding portions 1e are designed to form a clearance from the cutouts 10e of the knob as shown in FIG. 5. The four guiding portions 1e are circumferentially formed so that they are arranged one each on both sides of each of two groove portions 1c placed in diagonal opposed positions.

As shown in FIG. 1 and FIGS. 6 to 8, on the outer peripheral wall of the knob cover 1, an attachment portion 1d for attachment of a connection member 5 is formed. Both ends of the connection member 5 are connected to the attachment portion 1d and the engagement portion 75c respectively.

<Operations and Effects of the Manual Valve>

Operations of the manual valve 6 are now explained below. A first explanation is made for an operational process of transmitting rotation of the knob 10 to the sliding nut 20 through the engagement member 30 to move the rod 50 in the opening/closing direction VL.

As shown in FIG. 4, the engagement member 30 is fixed in engagement with the first and second locking portions 14 and 15 of the knob 10 and the engagement part 21 of the sliding nut 20, thus holding six of the eight outer surfaces 21a of the engagement part 21 of the sliding nut 20. Accordingly, the knob 10 and the sliding nut 20 are integrally connected. As shown in FIG. 2, since the sliding nut 20 is held by the flange 24 and the body 80 against movement in the opening/closing direction VL, the sliding nut 20 is coaxially rotated with the knob 10 when the knob 10 is rotated. The internal thread portion 22 of the sliding nut 20 is threadedly engaged with the external thread portion 52 of the rod 50 and the rod 50 is prevented from rotation on its axis in the rod holding member 81. Consequently, when the knob 10 is rotated, the sliding nut 20 is simultaneously rotated, so that the rod 50 can be moved relative to the sliding nut 20 in the opening/closing direction VL by screw feeding through the engagement of the internal thread portion 22 of the sliding nut 20 and the external thread portion 52 of the rod 50.

Secondly, an operation for shifting the manual valve 6 from a valve closed state to a valve open state is explained.

In the manual valve 6 of the present embodiment, the internal thread portion 22 of the sliding nut 20 and the external thread portion 52 of the rod 50 are both left-hand threads. Therefore, when the knob 10 is rotated clockwise, the rod 50 is moved downward to the valve closing side. When the knob 10 is rotated counter-clockwise, the rod 50 is moved upward to the valve opening side.

For opening the valve, the knob 10 is rotated in one direction (counter-clockwise), causing the sliding nut 20 to rotate coaxially with the knob 10. With this rotation of the sliding nut 20, the rod 50 is moved to the valve opening side in the opening/closing direction VL (upward in FIG. 2). In this way, the valve element 63 connected to the rod 50 is separated from the valve seat 93 to open the valve.

Thirdly, an operation for shifting the manual valve 6 from the valve open state to the valve closed state is explained below.

For closing the valve, when the knob 10 is rotated in the opposite direction (clockwise) with torque of less than or equal to the predetermined value, the sliding nut 20 is coaxially rotated with the knob 10 in the same direction. With this rotation of the sliding nut 20, the rod 50 is moved to the valve closing side in the opening/closing direction VL (downward in FIG. 2).

Even if the knob 10 is further rotated after the valve element 63 connected with the rod 50 is brought into contact with the valve seat 93, the rod 50 is not allowed to further move downward to the valve closing side (downward in FIG. 1) lower than a contact portion between the valve element 63 and the valve seat 93. Consequently, the torque to rotate the knob 10 becomes larger than the predetermined value.

In the manual valve 6, the knob 10 and the sliding nut 20 are integrally connected by the engagement member 30. While the contact surface 14a of the first locking portion 14 of the knob 10 and the first contact surface 31a of the fixing portion 31 of the engagement member 30 are remained to be in contact, as shown in FIG. 4, the holding portions 32 of the engagement member 30 are elastically deformed outwardly in the inward-outward direction when the larger torque than the predetermined value is applied. Therefore, even if an operator keeps rotating the knob 10 after the valve element 63 is brought into contact with the valve seat 93, the contact surfaces 32a of the holding portions 32 are separated from the outer surfaces 21a of the engagement part 21 of the sliding nut 20 by the elastic deformation of the holding portions 32, and thereby disengaging the holding portions 32 from the engagement part 21. As a result, the knob 10 and the engagement member 30 turn free in a circumferential direction with respect to the engagement part 21 of the sliding nut 20, failing to transmit the rotation of the knob 10 to the sliding nut 20.

In other words, the manual valve 6 in the first embodiment comprises the valve seat 93 placed in the chemical liquid flow passage communicating with the first and second ports 91 and 92, the valve element 63 movable into or out of contact with the valve seat 93 to control the flow of the chemical liquid, the rod 50 connected to the valve element 63, and the knob 10 for moving the rod 50 by screw feeding mechanism in the opening/closing direction VL with respect to the valve element 63. The manual valve 6 is arranged to move the valve element 63 through the rod 50 by the rotation of the knob 10. The rod 50 including the external thread portion 52 on an outer periphery thereof is not connected to the knob 10 but is prevented from rotating. Further, the manual valve 6 includes the cylindrically shaped sliding nut 20 rotatably held by the body 80 and formed with the internal thread portion 22 on an inner periphery, the internal thread portion 22 being engaged with the external thread portion 52 of the rod 50, and further includes the engagement member 30 fixed with the knob 10 and engaged with the sliding nut 20 to be elastically deformable. The engagement member 30 is deformed to be disengaged when the larger torque than the predetermined value is applied. Therefore, when the knob 10 is rotated with the larger torque than the predetermined value, the engagement member 30 releases the knob 10 from the engagement with the sliding nut 20. The sliding nut 20 is not allowed to further rotate. On the other hand, the rod 50 is neither connected to the knob 10 nor allowed to rotate inside the rod holding member 81 by the rotation stopper member 53. Accordingly, if the sliding nut 20 is not rotated, the rod 50 cannot be moved in the opening/closing direction VL relative to the sliding nut 20 by screw feeding through engagement between the external thread portion 52 of the rod 50 and the internal thread portion 22 of the sliding nut 20.

Consequently, even if the knob 10 is rotated with the lager torque than the predetermined value, the valve element 63 is not moved with the rod 50, so that the valve element 63 is prevented from excessively pressing the valve seat 93. Therefore, the valve seat 93 can be prevented from damages due to pressure of the valve element 63.

<Operations and Effects of the Knob Cover>

The manual valve 6 is operated as described above in a state that the knob cover 1 is detached from the manual valve 6 as shown in FIG. 2.

For detaching the knob cover 1 from the manual valve 6, specifically, the knob cover 1 is lifted upward in FIG. 1. When the knob cover 1 is lifted, the snaps 1b hooked on a lower edge portion 10c of the knob 10 are elastically outwardly deformed, the snaps 1b being moved upward onto a side surface 10b of the knob 10. Subsequently, the knob cover 1 is further lifted upward so that the knob cover 1 is detached from the manual valve 6.

The thus detached knob cover 1 is still connected to the manual valve 6 by the connection member 5. Therefore, the knob cover 1 is hung from the manual valve 6 after detachment.

The connection member engagement portion 75c has an internal space for rotatably storing at least one of beads 4a of the connection member 5. Accordingly, the connection member 5 can change its orientation freely in 360 degrees about the bead 4a received in the internal space of the engagement portion 75c. Therefore, no stress is concentrated on the connection member 5 even when the knob cover 1 is hung from the manual valve 6 through the connection member 5. Consequently, the connection member 5 is prevented from breaking and the knob cover 1 is prevented from dropping off and becoming lost.

While the manual valve 6 is not operated, the knob cover 1 is mounted on the manual valve 6 as shown in FIGS. 1 and 3. To be concrete, the knob cover 1 is put on the knob 10 of the manual valve 6 from above (in FIG. 2). The inner diameter of the knob cover 1 is designed larger than the outer diameter of the knob 10, so that the knob cover 1 is able to cover the knob 10.

Successively, the knob cover 1 is moved downward and then the guiding portions 1e on the inner peripheral surface of the knob cover 1 are engaged in the cutouts 10e of the knob 10. This engaged state is shown in FIG. 5. If the guiding portions 1e are misaligned with the cutouts 10e of the knob 10, the knob cover 1 is rotated to align the guiding portions 1e with the cutouts 10e into engagement. After the guiding portions 1e are appropriately engaged with the cutouts 10e, the knob cover 1 can be moved vertically downward with respect to the knob 10 without wobbling. The knob cover 1 can be thus moved downward in the vertical direction with respect to the knob 10, so that the first engagement portion 75a of the locking cover 75 can be engaged with the engagement portion 1a of the knob cover 1 in a subsequent process. Since both the first engagement portion 75a and the engagement portion 1a are of knurled shapes, the knob cover 1 has to be moved downward in the vertical direction for engagement. Otherwise, the manual valve 6 and the knob cover 1 are not allowed to be engaged.

The knob cover 1 is further moved downward, causing the snaps 1b that abut on an upper peripheral edge portion 10a of the knob 10 to be elastically outwardly deformed and slid onto the side surface 10b of the knob 10.

When the knob cover 1 is then moved downward, the engagement portion 1a of the knob cover 1 is engaged with the first engagement portion 75a of the locking cover 75. If the engagement portion 1a and the first engagement portion 75a are misaligned, an operator has only to rotate the knob cover 1 so that the engagement portion 1a is appropriately aligned with the first engagement portion 75a.

After the engagement, the snaps 1b are returned to an original state from the elastically deformed state. The snap fitting protrusions 1bt of the snaps 1b are thus hooked on the lower edge portion 10c of the knob 10.

In a lower portion of the knob cover 1, the engagement portion 1a and the first engagement portion 75a of the locking cover 75 are engaged and in an upper portion of the knob cover 1, the snap fitting protrusions 1bt of the snaps 1b are hooked on the lower edge portion 10c of the knob 10. In this manner, the knob cover 1 is fixed to the manual valve 6.

The manual valve 6 is covered by the knob cover 1 so that access to the knob 10 is disallowed. Therefore, even when an operator operates a manual valve placed on the far side from the operator, he/she is unlikely to accidentally touch a manual valve placed on the near side to the operator and rotate a knob 10 thereof. The knob 10 is not rotated and hence the operator does not misunderstand that valve opening/closing of the valve assembly 100 is completed. Furthermore, the outward appearance of the valve 100 attached with the knob cover 1 makes it easy for the operator to recognize that the valve 100 is in a locked state. The knob 10 is not permitted to rotate and thus the operator can perform the operation precisely. Consequently, a precise flow rate can be achieved.

Furthermore, the engagement portion 1a and the first engagement portion 75a are engaged with each other, thereby preventing the rotation of the knob cover 1. As a result of preventing the rotation of the knob cover 1, the valve assembly 100 is surely locked. Therefore, the rotation of the knob 10 and the operation of the ratchet mechanism are disabled, so that the operator is unlikely to misunderstand that the valve opening/closing of the valve assembly 100 is completed. Moreover, the valve 100 is so reliably locked that the valve 100 is neither loosened nor rotated even if receiving unintended vibration.

In some cases, the valve assembly 100 is installed in a reversed orientation from the one shown in FIGS. 1 and 3 so that the knob 10 is located in the lowermost position. Even in such a configuration, the knob cover 1 is not disengaged from the manual valve 6 because the knob cover 1 is fixed, at its upper and lower portions, to the manual valve 6.

As mentioned above, the valve assembly 100 in the first embodiment has the following advantages.

(1) In the valve assembly 100, the rod 50 is formed with the external thread portion 52 on an outer periphery thereof, the rod 50 being unconnected to the knob 10 but being held against rotation. The valve 100 further includes the sliding nut 20 of a cylindrical shape, the sliding nut 20 being rotatably held by the body 80 and internally formed with the internal thread portion 22 to be threadedly engaged with the external thread portion 52 of the rod 50, and the engagement member 30 fixed to the knob 10, the engagement member 30 being elastically deformable to be engaged with the sliding nut 20 and disengaged from the sliding nut 20 when larger torque than the predetermined value is applied. Furthermore, the valve 100 includes the hollow knob cover 1 for covering the knob 10. With the above configuration, access to the knob 10 is not allowed. Therefore, while an operator operates a manual valve placed on the far side from the operator, he/she is unlikely to accidentally touch a manual valve placed on the near side to the operator and rotate a knob 10 thereof. The knob 10 is not rotated and hence the operator does not misunderstand that the valve opening/closing of the valve assembly 100 is completed.

Furthermore, the outward appearance of the valve 100 attached with the knob cover 1 makes it easy for the operator to recognize that valve 100 is in a locked state.

Consequently, the knob 10 is not permitted to rotate and thus the operator can perform the operation precisely. Consequently, a precise flow rate can be achieved.

(2) The first engagement portion 75a of the locking cover 75 is formed in the manual valve 6 and the engagement portion 1a is formed in the knob cover 1 to prevent the rotation of the knob cover 1, thereby surely locking the valve assembly 100. Therefore, the rotation of the knob 10 and operation of the ratchet mechanism are disabled, so that the operator is unlikely to misunderstand that the valve opening/closing of the valve assembly 100 is completed.

Moreover, the valve assembly 100 is so reliably locked that the valve 100 is neither loosened nor rotated even if receiving unintended vibration.

The lower portion of the knob cover 1 and the manual valve 6 are fixed together via the engagement portion. Accordingly, in a case that the knob cover 1 is mounted upside down, the knob cover 1 is not disengaged from the manual valve 6.

(3) The knob cover 1 is further formed with the snaps 1b having the snap fitting protrusions 1bt radially inwardly protruding from distal ends of the snaps 1b in order to fix the upper portion of the knob cover 1 and the manual valve 6 together. Therefore, in a case that the knob cover 1 is mounted upside down, the knob cover 1 is not disengaged from the manual valve 6.

(4) The valve assembly 100 is formed with the connection member 5 to connect the manual valve 6 and the knob cover 1. Even when the knob cover 1 is disengaged from the manual valve 6, accordingly, the knob cover 1 is prevented from dropping off by the connection member 5.

When the knob cover 1 is detached and the knob 10 is rotated to open/close the manual valve 6, the detached knob cover 1 does not have to be put in some other place during the operation. This can prevents the operator from forgetting to attach the knob cover 1 to the manual valve 6 after the valve opening/closing operation.

(5) The knob cover 1 is formed with the guiding portions 1e on an inner peripheral surface thereof to be engaged with the knob 10. Accordingly, the knob cover 1 is smoothly moved downward in a vertical direction with respect to the knob 10, so that the first engagement portion 75a of the manual valve 6 and the engagement portion 1a of the knob cover 1 can be engaged. The first engagement portion 75a and the engagement portion 1a are of knurled shape respectively and therefore they have to be moved downward in a vertical direction to be engaged.

Second Embodiment

Figure 12:
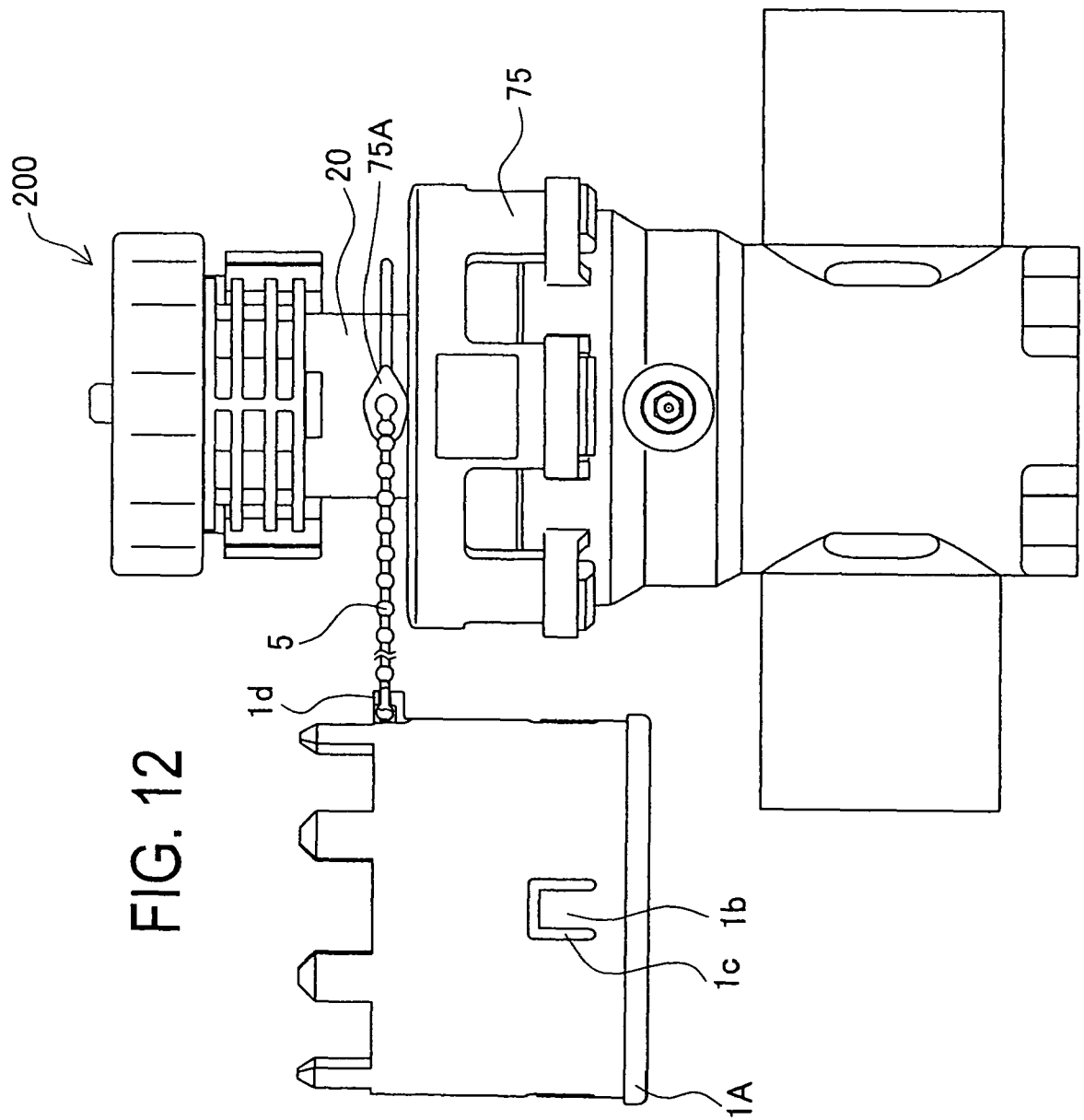
FIG. 12 is an external view of a cover-equipped manual valve in a second embodiment.

A second embodiment of the invention is now explained below. FIG. 12 is a front view of a cover-equipped manual valve (hereinafter, also referred to as a "valve assembly") 200 in the second embodiment. A basic internal configuration of the valve assembly 200 of the second embodiment is similar to that of the first embodiment illustrated in FIGS. 1 to 11. Therefore, similar or identical components and portions are given the same referential signs with those in the first embodiment and their detailed explanations will not be repeated. The following explanation is made with a focus on the differences from the first embodiment.

Figure 14:
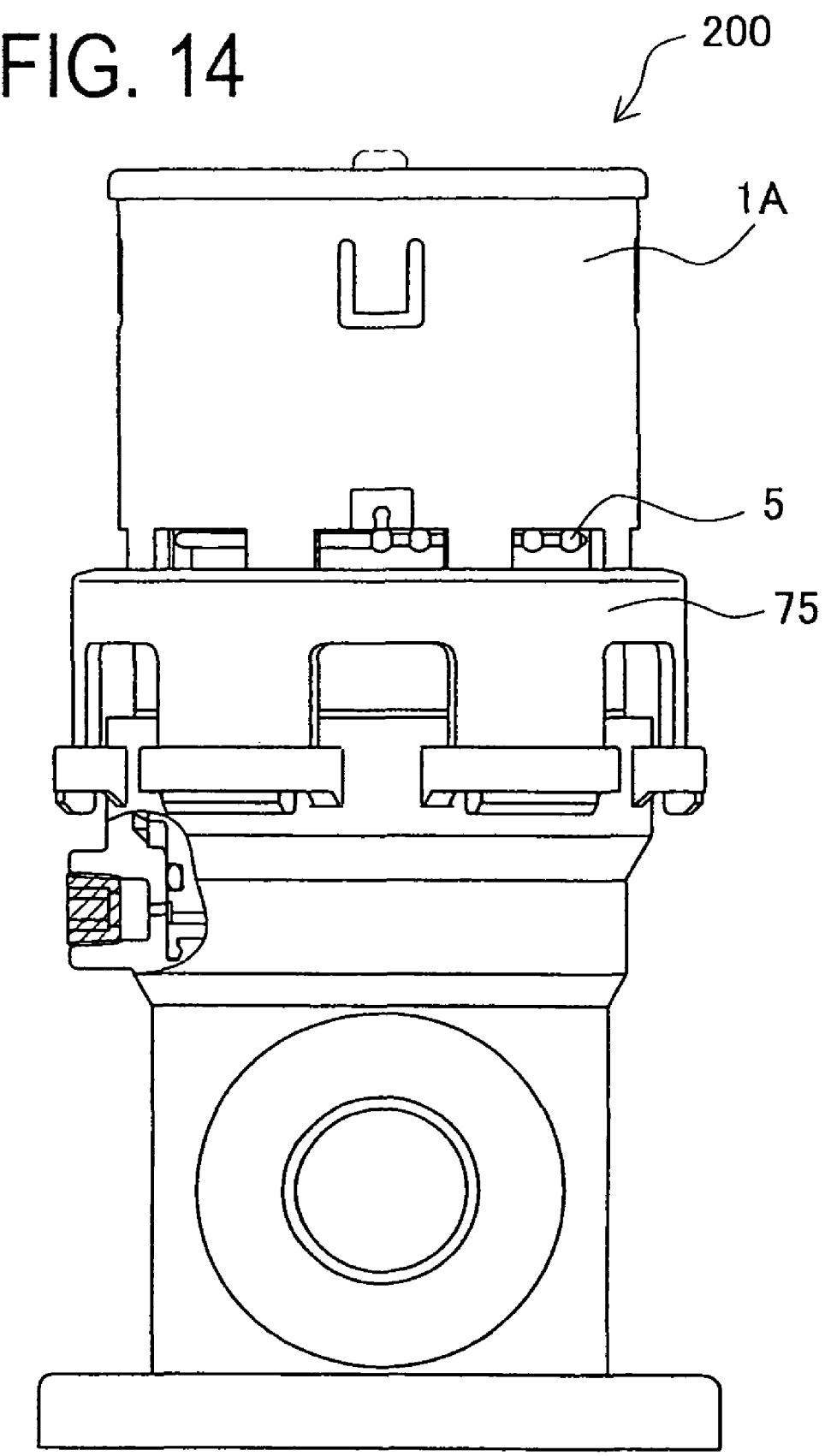
FIG. 14 is a right-side view of the cover-equipped manual valve in FIG. 12.
Figure 15:
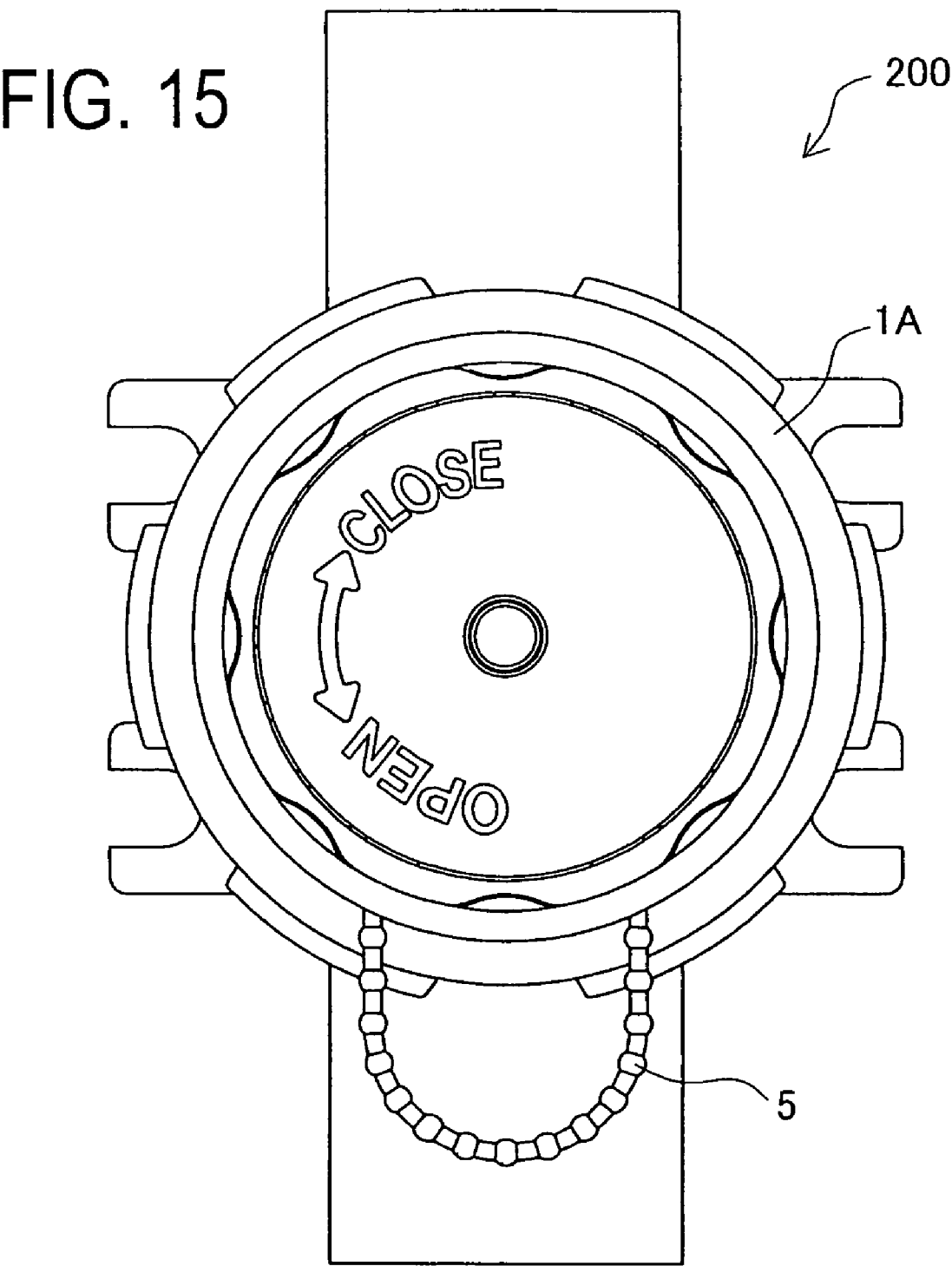
FIG. 15 is a plan view of the cover-equipped manual valve in FIG. 12.

FIG. 12 shows the valve assembly 200 from which a knob cover 1A is detached. The valve assembly 200 of the second embodiment is different from the valve assembly 100 of the first embodiment in terms of the knob cover 1A and a sliding nut holding member 82A to be engaged with the knob cover 1A. FIG. 14 is a right-side view of the cover-equipped manual valve 200 and FIG. 15 is a plan view of the cover-equipped manual valve 200.

<Configuration of the Knob Cover 1A>

Figure 16:
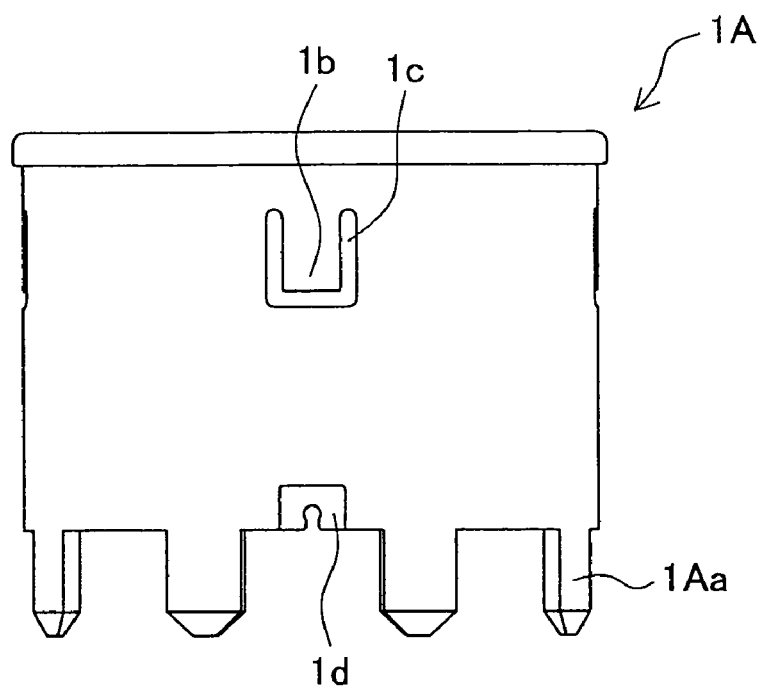
FIG. 16 is a front view of a knob cover in the second embodiment.
Figure 17:
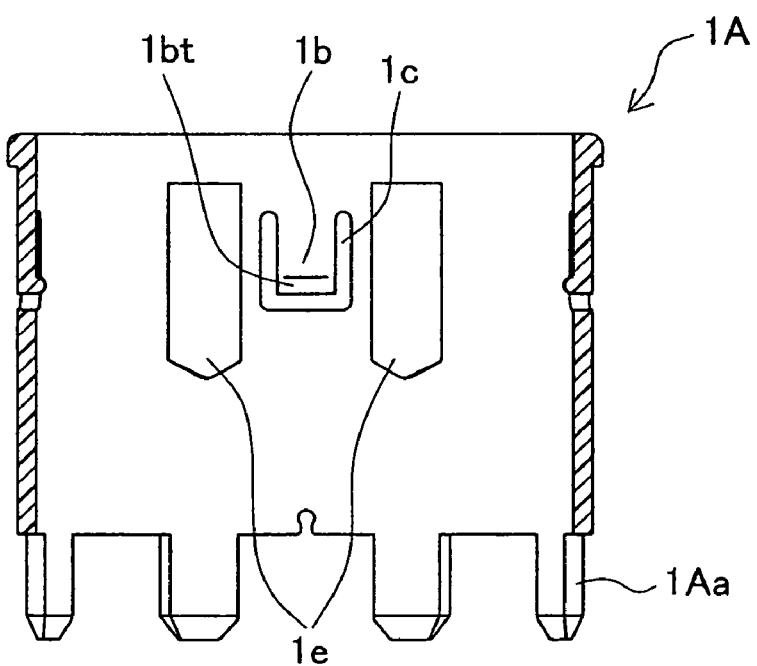
FIG. 17 is a cross-sectional view of the knob cover in FIG. 16.

FIG. 16 is a front view of the knob cover 1A. FIG. 17 is a sectional front view of the knob cover 1A.

The knob cover 1A is of a hollow cylindrical shape. Eight engagement portions 1Aa are formed on a lower end of the knob cover 1A. Each engagement portion 1Aa has a tapered distal end. The engagement portions 1Aa are formed to have equal widths and extend downward from the lower end of the knob cover 1A and spaced at equal intervals.

Other configuration of the knob cover 1A is similar to that of the knob cover 1 in the first embodiment, so explanation thereof is not repeated.

<Configuration of the Sliding Nut Holding Member 82A>

Figure 18:
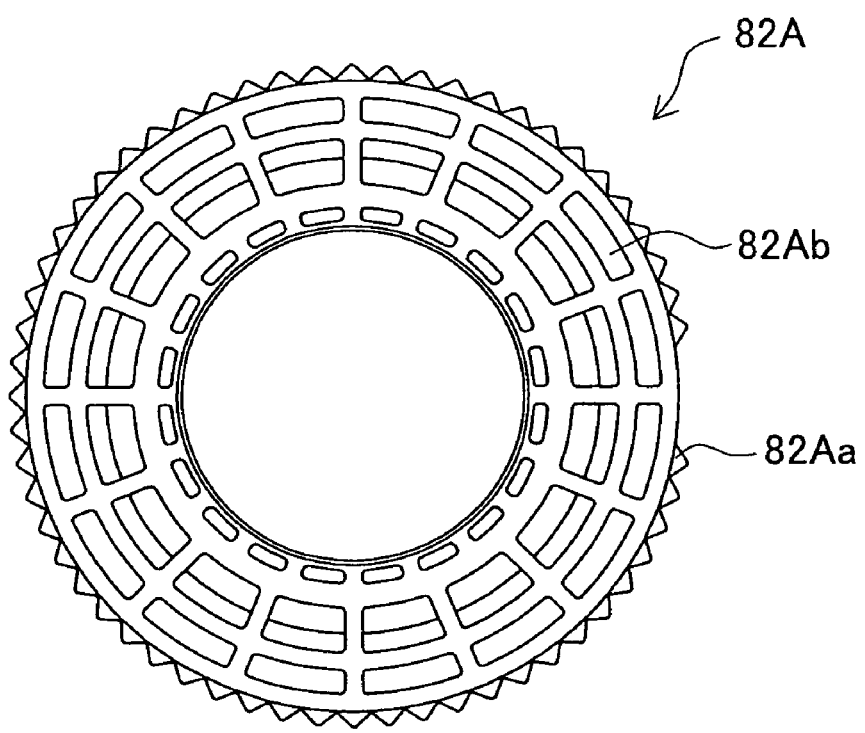
FIG. 18 is a plan view of a sliding nut holding member in the second embodiment.
Figure 19:
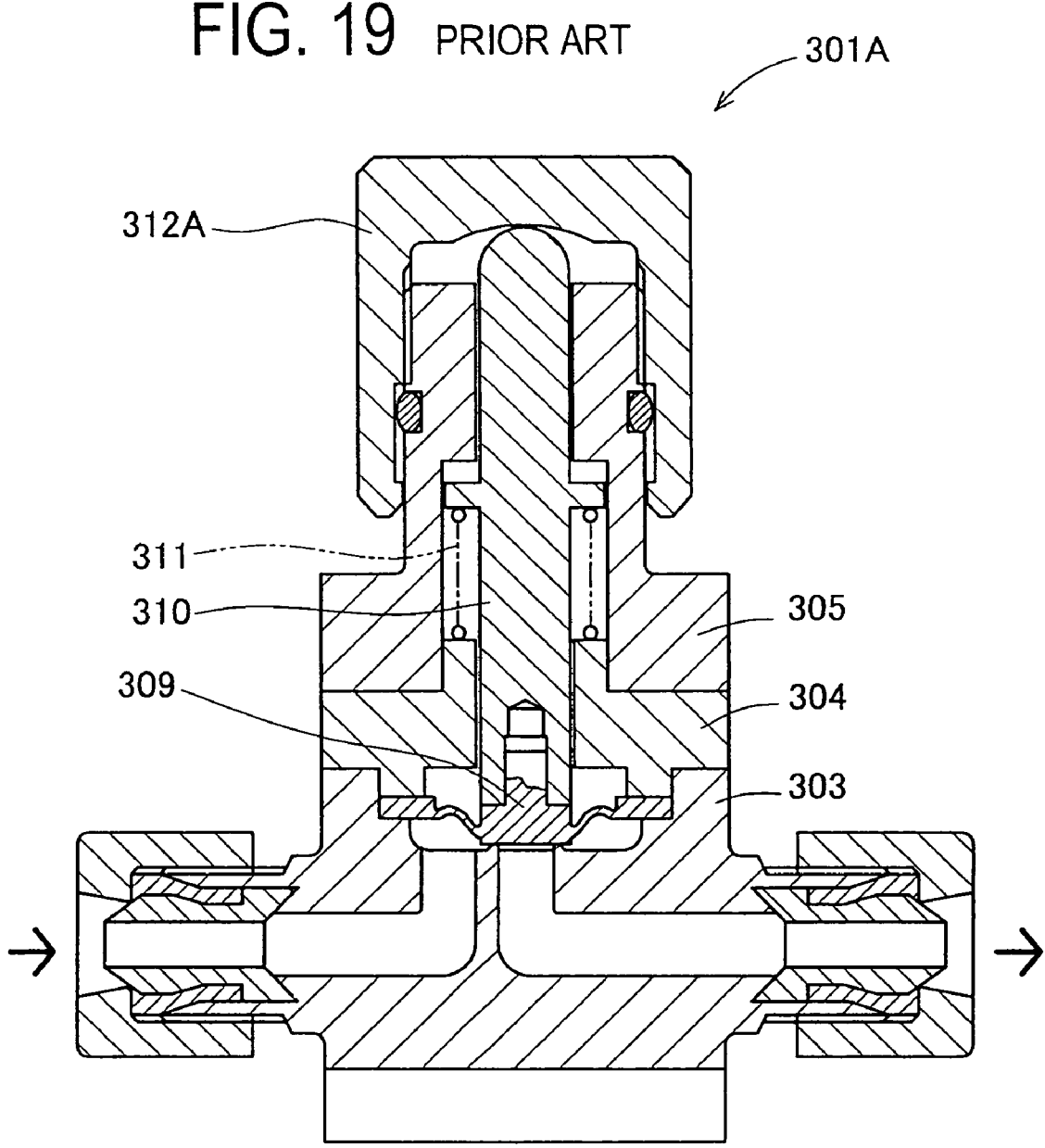
FIG. 19 is a cross-sectional view of a manual valve in a prior art.
Figure 20:
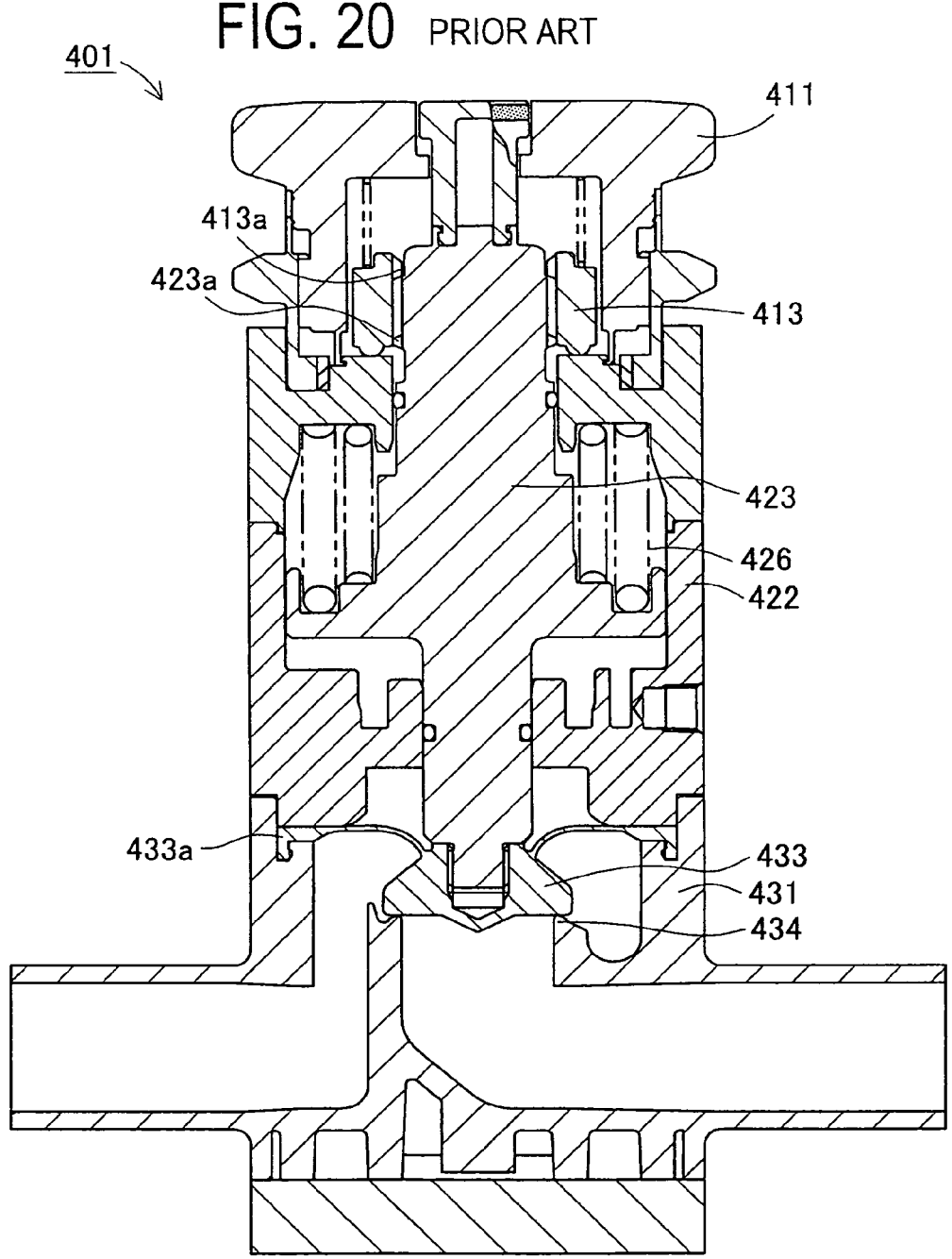
FIG. 20 is a cross-sectional view of a manual valve in a prior art.

FIG. 18 shows a plan view of the sliding nut holding member 82A.

The sliding nut holding member 82A is of a hollow cylindrical shape. As shown in FIG. 18, on an upper surface of the holding member 82A, insert portions 82Ab are formed to have equal widths and arranged at equal intervals. The insert portions 82Ab are holes in which the engagement portions 1Aa of the knob cover 1A are to be inserted.

Further, on an outer periphery of the upper portion of the holding member 82A, an engagement portion 82Aa having a knurled shape engageable with the locking cover 75 is circumferentially formed.

Figure 13:
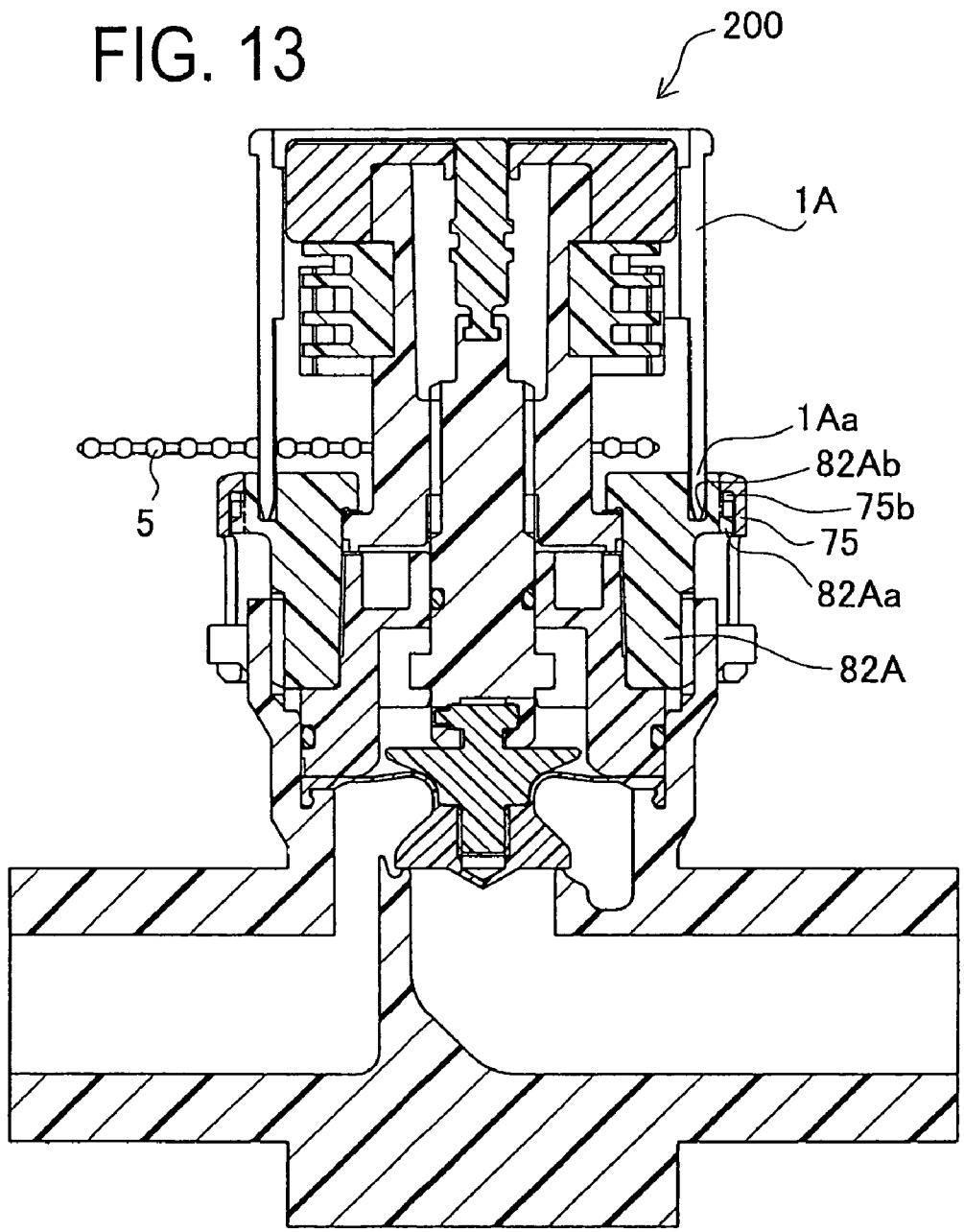
FIG. 13 is a cross-sectional view of the cover-equipped manual valve in FIG. 12.

When the knob cover 1A is mounted on the manual valve 6 as shown in FIG. 13, the knob cover 1A is engaged with the sliding nut holding member 82A. Specifically, the engagement portions 1Aa of the knob cover 1A are inserted into the insert portions 82Ab of the holding member 82A, thereby holding the knob cover 1A against rotation. Therefore, the manual valve is reliably locked. As a result, rotation of the knob 10 and operation of the ratchet mechanism are prevented, so that an operator is unlikely to misunderstand that the valve opening/closing of the valve assembly 200 is completed.

Moreover, the valve assembly 200 is so reliably locked that the valve 200 is neither loosened nor rotated even if receiving unintended vibration.

The present invention may be embodied in other specific forms without departing from the essential characteristics thereof.

For example, the connection member 5 of the embodiments is a string of beads. Alternatively, a spring, a leather belt, and others may be adopted.

The knob cover 1 may be applied to even a manual valve comprising no ratchet mechanism.

Further, the four guiding portions 1e are formed in the embodiments. Alternatively, more than or less than four guiding portions 1e may be formed.

Furthermore, the guiding portions 1e and the cutouts 10e of the knob 10 each have an arc-shape or curved shape in section. Alternatively, they may have other shapes such as a rectangular shape in section like gear teeth.

While the presently preferred embodiment of the present invention has been shown and described, it is to be understood that this disclosure is for the purpose of illustration and that various changes and modifications may be made without departing from the scope of the invention as set forth in the appended claims.

REFERENCE SIGNS LIST

1 Knob cover
1a Engagement portion
1bt Snap fitting protrusion
5 Connection member
6 Manual valve
10 Knob
20 Sliding nut
22 Internal thread portion
30 Engagement member
50 Rod
52 External thread portion
75 Locking cover
75b Second engagement portion
80 Body
100 Cover-equipped manual valve (Valve assembly)

The invention claimed is:

1. A cover-equipped manual valve comprising:
a manual valve including:
an inlet port;
an outlet port;
a valve seat formed in a passage for fluid communicating the inlet port and the outlet port;
a valve element that is movable into or out of contact with the valve seat to control a flow of the fluid;
a rod connected to the valve element;
a knob for moving the rod by screw feeding in an opening/closing direction of the valve element; and
a body,
the cover-equipped manual valve being arranged to move the valve element through the rod by rotation of the knob,
wherein the rod is formed with an external thread portion on an outer periphery thereof, the rod being unconnected to the knob and held against rotation,
the cover-equipped manual valve further comprises:
a rod feeding member of a cylindrical shape, the rod feeding member being rotatably held by the body and internally formed with an internal thread portion threadedly engaged with the external thread portion of the rod;
an engagement member fixed to the knob, the engagement member being elastically deformable to be engaged with the rod feeding member and to be disengaged from the rod feeding member when larger torque than a predetermined value is applied to the engagement member; and
a knob cover of a hollow cylindrical shape for covering the knob,
a cover engagement portion being formed on an inner periphery of the hollow cylindrical knob cover, the cover engagement portion being engaged with a manual valve engagement portion formed on an outer periphery of the manual valve,
the knob cover including snaps formed with protrusions radially inwardly protruding, and
the knob cover having guiding portions on the inner periphery, the guiding portions being engageable with the knob so that the knob cover is enabled to smoothly move downward in a vertical direction with respect to the knob.

2. The cover-equipped manual valve according to claim 1 further comprising a connection member for connecting the manual valve and the knob cover.

3. The cover-equipped manual valve according to claim 1, wherein the cover engagement portion is adapted to be engaged with the manual valve engagement portion without rotational movement.

4. The cover-equipped manual valve according to claim 1, wherein
the cover engagement portion is knurled-shaped,
the manual valve engagement portion is knurled-shaped, and
the cover engagement portion and the manual valve engagement portion are adapted to be fitted together.

5. The cover-equipped manual valve according to claim 1, wherein each of the snaps are formed with a cutout on an outer periphery of the knob cover.

* * * * *